(12) United States Patent
Ismail et al.

(10) Patent No.: US 7,860,937 B2
(45) Date of Patent: Dec. 28, 2010

(54) MESSAGING AND SERVICE SYSTEM FOR MOBILE COMPUTER

(75) Inventors: Samir Ismail, Dublin, CA (US); Tuan Tran, San Jose, CA (US); Jianyu Roy Zheng, San Diego, CA (US); Ron Ludwig, Tracy, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 639 days.

(21) Appl. No.: 10/977,356

(22) Filed: Oct. 29, 2004

(65) Prior Publication Data

US 2005/0114895 A1 May 26, 2005

Related U.S. Application Data

(60) Provisional application No. 60/518,285, filed on Nov. 7, 2003.

(51) Int. Cl.
G06F 15/16 (2006.01)

(52) U.S. Cl. .................. 709/207; 709/228; 709/206

(58) Field of Classification Search ................. 709/228, 709/206, 207
See application file for complete search history.

(56) References Cited

U.S. PATENT DOCUMENTS

| | | | |
|---|---|---|---|
| 6,408,095 B1 | 6/2002 | Maeda et al. | |
| 6,493,758 B1 * | 12/2002 | McLain | 709/227 |
| 6,961,754 B2 * | 11/2005 | Christopoulos et al. | 709/204 |
| 7,216,177 B1 * | 5/2007 | Strong et al. | 709/230 |
| 7,260,641 B2 * | 8/2007 | Decker et al. | 709/233 |
| 2002/0173295 A1 | 11/2002 | Nykanen et al. | |
| 2003/0037181 A1 | 2/2003 | Freed | 709/328 |
| 2003/0054810 A1 * | 3/2003 | Chen et al. | 455/422 |
| 2004/0043758 A1 * | 3/2004 | Sorvari et al. | 455/414.1 |
| 2004/0064431 A1 | 4/2004 | Dorner et al. | 707/1 |
| 2004/0098306 A1 * | 5/2004 | Fitzpatrick et al. | 705/14 |
| 2004/0111467 A1 * | 6/2004 | Willis | 709/203 |
| 2004/0128353 A1 * | 7/2004 | Goodman et al. | 709/204 |
| 2004/0148375 A1 | 7/2004 | Levett et al. | 709/223 |
| 2004/0162871 A1 * | 8/2004 | Pabla et al. | 709/201 |
| 2004/0221062 A1 * | 11/2004 | Starbuck et al. | 709/246 |
| 2004/0260922 A1 * | 12/2004 | Goodman et al. | 713/154 |
| 2005/0032543 A1 * | 2/2005 | Adkins | 455/550.1 |
| 2006/0026302 A1 * | 2/2006 | Bennett et al. | 709/246 |

FOREIGN PATENT DOCUMENTS

| | | |
|---|---|---|
| CN | 1177886 | 4/1998 |
| WO | 01/80002 | 10/2001 |

* cited by examiner

*Primary Examiner*—Vivek Srivastava
*Assistant Examiner*—Thomas Duong
(74) *Attorney, Agent, or Firm*—John L. Rogitz

(57) ABSTRACT

A service sends rich content messages including text and photos between any mobile device and potentially across a heterogeneous network. Furthermore, to enhance the user experience, content can be delivered based on personal preferences and device display capabilities.

8 Claims, 5 Drawing Sheets

SYSTEM

MQ MESSAGING SYSTEM

LOGIC FOR SENDING MESSAGE

LOGIC FOR RECEIVING MESSAGE

Fig. 7

SAMPLE SOAP
SERVICE REQUEST

```xml
<?xml version="1.0" encoding="utf-8" ?>
<WeatherInfo
    xmlns:xsd="http://www.w3.org/2001/XMLSchema"
    xmlns:xsi="http://www.w3.org/2001/XMLSchema-instance"
    xmlns="http://ejse.com/WeatherService/">
    <Location>San Jose, CA</Location>
    <IconIndex>34</IconIndex>
    <Temprature/>
    <FeelsLike>71°F</FeelsLike>
    <Forecast>Fair</Forcast>
    <Visibility>Unlimited</Visibility>
    <Pressure>29.93 inches and steady</Pressure>
    <DewPoint>54°F</DewPoint>
    <UVIndex>1 Minimal</UVIndex>
    <Humidity>55%</Humidity>
    <Wind>From the North Northwest at 20 mph</Wind>
    <ReportedAt>San Jose, CA</ReportedAt>
    <LastUpdated>Monday, September 29, 2003, at 4:53 PM Pacific Daylight Time (Monday,7:53 PM EDT).</LastUpdated>
</WeatherInfo>
```

MESSAGING AND SERVICE SYSTEM FOR MOBILE COMPUTER

RELATED APPLICATIONS

This application claims priority from U.S. provisional patent application Ser. No. 60/518,285, filed Nov. 7, 2003.

FIELD OF THE INVENTION

The present invention relates generally to messaging and computer services for mobile computers.

BACKGROUND

The advent of mobile devices and their enhanced capabilities has precipitated efforts to tap the vast information and services available on the Internet and extend them to wireless mobile devices such as wireless telephones and personal digital assistants (PDAs). These devices are easy to carry, provide ample level of battery life for remote operations, and contain sophisticated operating systems to serve as adequate platforms for mobile messaging and information services.

As understood herein, messaging encompasses the ability to send text and/or multimedia content such as photos, audio and video. Further, "services" can include information on demand such as stock quotes, weather, headline news, etc., preferably provided over a Wide Area Network (WAN) such as the Internet.

As recognized herein, a challenge is in building a service that makes market sense for mobile devices. For instance, the capabilities of the target mobile device dictates the strength of the services that can be delivered to that device. This in turn implicates the need for a client application that is sufficiently capable to exploit the resources that are present on the client device.

Furthermore, as recognized herein a server application should be provided that is capable of handling messages not only to a specific device but also to the granularity of a specific user. Also, information services can be dependent on the ability of the device is receiving and displaying the content, posing yet another challenge in providing them to wireless computing devices.

SUMMARY OF THE INVENTION

A service is disclosed that includes sending, to a wireless computing device, rich content messages including text and photographs. The messages may be sent across a heterogeneous network, and message content can be based on personal preferences of a user, and/or on display capabilities of the device. The personal preference can be in the form of a personal profile that essentially is an information filter stored on a Web server to optimize bandwidth. The filter can be increased or decreased in strength as desired by the user of a wireless device communicating with the server.

In some embodiments, the device sends an XML request to send a message, and the method includes authenticating the user of the device using an external authentication module. The method can also include validating message content format to ensure the message includes only text and/or photographs, and then generating a Java Message Service (JMS) message and sending it to a server queue. A wireless device can send an XML request for messages addressed to the device, and if the user of the requesting device is authenticated, the server queue is checked for messages intended for the requesting device. The messages, if any, are formatted for the device per user-defined preferences and sent to the device.

In another aspect, a messaging system includes a wireless computing device and a load balance server communicating with the wireless computing device. The system also includes an application server communicating with the load balance server, and a Web page server communicating with the load balance server. Further, a database server can communicate with the load balance server. The application server includes a Message Queue (MQ) server application, with the server application in turn including a server part, a client runtime part, an administered object part, and an administration part.

In still another aspect, a method is disclosed for providing at least one information service to a wireless computing device. The method includes receiving, from the mobile device, an initial information request. Using a web service platform on an application server, a Simple Object Application Protocol (SOAP) request is generated and sent to a third party web server, which sends back a SOAP response containing the requested information. The method includes providing the information to the wireless computing device.

The details of the present invention, both as to its structure and operation, can best be understood in reference to the accompanying drawings, in which like reference numerals refer to like parts, and in which:

BRIEF DESCRIPTION OF THE DRAWINGS

FIG. 7 is a sample SOAP request.

DETAILED DESCRIPTION OF THE PREFERRED EMBODIMENT

The following acronyms may be used herein: Java Message Service (JMS), Message Queue (MQ), Mobile Information Device Profile 2.0 (MIDP2), Java Technology for Wireless Industry (JTWI), Java 2 Platform Micro Edition (J2ME), Connected Limited Device Configuration (CLDC), Connected Device Configuration (CDC), Mobile Information Devices (MID), Personal Digital Assistant (PDA).

Figure 1:
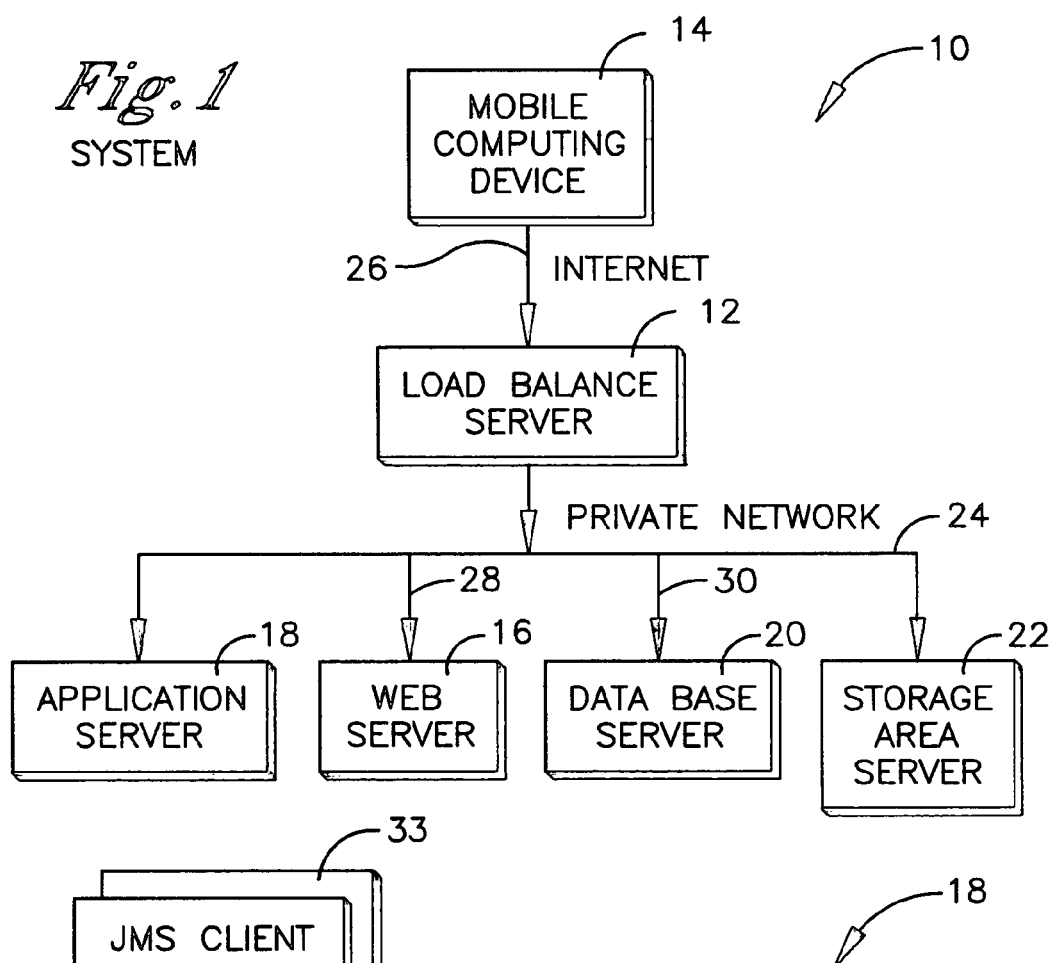
FIG. 1 is a block diagram of the present system architecture.

Referring initially to FIG. 1, a system is shown, generally designated 10, that includes one or more load balancing servers 12 communicating with one or more mobile computing devices 14 over a network such as the Internet. The mobile computing device 14 may be a wireless telephone, personal digital assistant (PDA), or other device that may use a non-personal computer (PC) operating system (OS), and in the embodiment shown that uses a Palm OS. The mobile computing device 14 can communicate with the server 12 over the Internet using, e.g., modems, 802.11 transceivers, Bluetooth infrared (IR) and/or radiofrequency (rf) transceivers, and the like.

It is to be understood that one or more of the processors of the computers shown herein undertake the logic shown and discussed below, which may be executed by a processor as a series of computer-executable instructions.

The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code or JAVA®.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention can be practiced in its essential embodiment by a machine component that renders the program code elements in a form that instructs a digital processing apparatus (that is, a computer) to perform a sequence of function acts corresponding to those shown.

The load balancing server 12 balances incoming message and service requests among plural web servers 16 and/or application servers 18 (only a single one of each is shown for clarity) to avoid choking any one of the servers. As contemplated herein, as the number of users increase, the web servers 16 can be horizontally scaled without disrupting the service. Security for transactions can be provided by using secure sockets layer (SSL) certificates that are accessible by the load balancing server 12, to relieve the web servers 16 of encryption and decryption processing.

The Web servers 16 host static hypertext markup language (HTML) pages. For each of the services provided to the mobile device 14, these servers 16 contain the web version of the service in the form of a portal. Accordingly, users of mobile devices 14 have the ability to directly log in from any Internet capable device and browse through the services. If desired, the Web servers 16 can be configured using Linux and Apache for the web service.

FIG. 1 shows that the system 10 can also include one or more application servers 18 that can contain the logic of the system 10 disclosed herein. If desired, the application servers 18 can operate on Linux with BEA Weblogic 8.1 to provide a powerful combination. Further, to detect mobile device capabilities, Mobile Aware's "Everix" software can be used, which is capable of passing the capabilities of the connecting mobile device on to the application servers 18 using application programming interfaces (APIs). Using its own list of mobile device capabilities, the application server 18 ascertains the capabilities of a requesting mobile device by matching the incoming device identification to identifications in its database, and then correlating the identification to capabilities. For reasons of security the application servers can be placed on a different virtual local area network (VLAN) that does not have direct connectivity to the Internet.

In addition to the servers discussed above, one or more database servers 20 (only one shown for clarity) can be provided. The database servers 20 can be clustered as a precaution against hardware and software failure. In some embodiments the database servers 20 can use Solaris with an Oracle database. This system contains the necessary user information for authentication. Also, the database servers 20 can store user information such as the preferences discussed further below to facilitate customized service delivery. Storage Area Networks (SAN) and/or Network Attached Storage (NAS) 22 can be provided for data storage.

As shown in FIG. 1, the load balancer server 12 can communicate with the servers 16-20 and SAN 22 using a virtual private network 24 that can include plural virtual local area networks (VLAN), i.e., different virtual local area networks (VLANs) can be provided for different pieces of equipment. For example, the load balancer server 12 may be placed on a global VLAN 26, which has direct connectivity to the Internet. The backend of the load balancer server 12 can be connected to a first private VLAN 28 which hosts the Web servers 16. For services, each of the web servers 16 can access the application server 18, and to balance the load in this layer of communication, the web servers 16 can be configured to alternatively open sessions with first and second application servers 18. In a similar fashion, the application servers are connected to all the VLANs. The database servers 20, in contrast, may be hosted on a second VLAN 30. Any SAN 22 that may be used can provide for direct connection to all servers to allow for fast access to necessary data from any of the servers.

Figure 2:
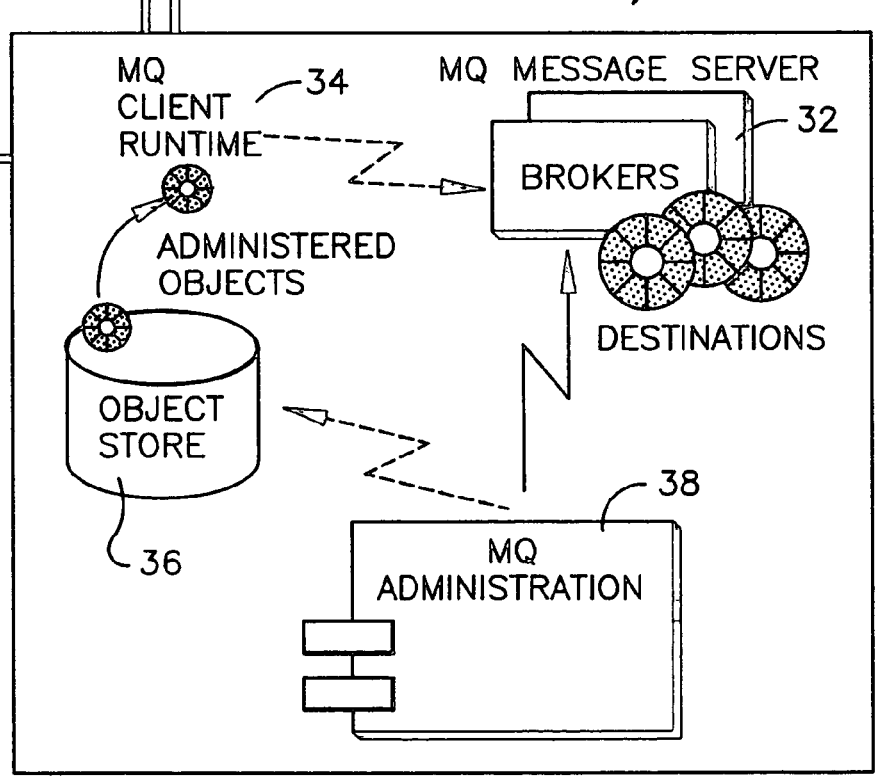
FIG. 2 is a schematic representation of an exemplary messaging system.

In one embodiment and referring now to FIG. 2, the present messaging service may use Sun's Message Queue (MQ) server application, which can be executed by the present application server 18. The architecture of the MQ system can be broken down into four parts, namely, the server part 32, the client runtime part 34, the administered object part 36, and administration part 38.

The MQ server part 32 constitutes the heart of the MQ system. It includes one or more brokers, which provide delivery services for the system. These services include connections to Java Messaging Service (JMS) clients 33 (messaging applications that are executed on the application server 18), message routing and delivery, persistence, security, and logging. The message server part 32 that may be executed by the application server 18 maintains physical destinations to which clients send messages, and from which the messages are delivered to consuming clients, as set forth more fully below.

The MQ Client runtime part 34 provides the interface between the JMS client and MQ message server part 32. It supports all the required operations needed by the JMS client to send and receive messages. The MQ administered objects part 36 encapsulates configuration information that can be specific to a particular wireless device 14. A user can use the MQ administration part 38 to create and manage these objects.

To describe the interaction of the applications (JMS clients 33) using JMS APIs, it must first be understood that JMS messages consist of a header, properties, and body. The MQ server part 32 generates most of the header information automatically, while some values can be specified or changed by the client 33. Typical information within the header includes destination, delivery mode, expiration time, priority status, etc. When a message is sent, information besides the payload carried in the body may be included in descriptive fields of its properties.

A component referred to as "connection factory" may be a JMS object that contains the service provider's configuration information. Per this configuration information, a connection is created to the MS server part 32 through which messages are transported. A session can be a single threaded context for producing and consuming messages, and may be used to define the message producers and consumers that send and receive messages.

A message producer can be created by passing the destination object to the session's method for creating a message producer. The same can be true for creating a message consumer. For asynchronous consumption, a so-called "message listener" can be used. The message listener may be registered with a message consumer.

In contrast to messaging, for information services, the system 10 acts as a broker between the mobile devices 14 and third party vendors where the content lies. The information services' application can be designed to accept and parse the incoming request, connect to the appropriate third party web service to gather the information, and pass the information back to the mobile device 14 in the appropriate format.

Figure 3:
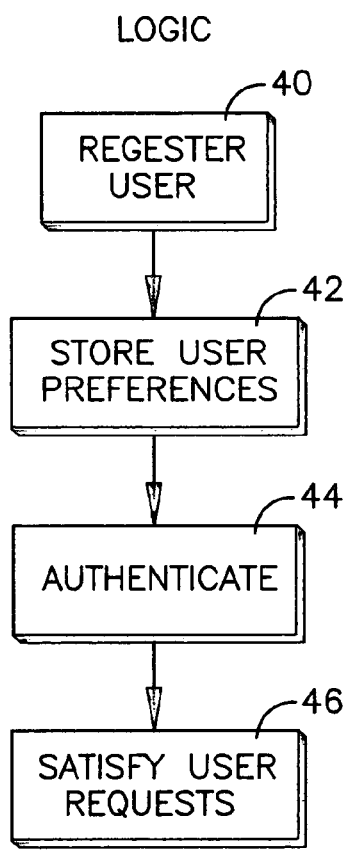
FIG. 3 is a flow chart of the overall logic.

Referring to FIG. 3, a user of a wireless device 14 can first register in accordance with conventional registration processes known in the art at block 40, and then user preferences can be stored at block 42. The user can be authenticated at block 44, with user requests for messaging and services being satisfied at block 46.

With more specificity, services can be customized to each mobile device 14 in the system 10 if desired by storing customer preferences in a database of the system 10 and then acting upon these preferences when providing each of the services. This essentially acts as an information filter that is stored on the server, and thus need not be stored on a wireless client device.

Examples of possible customization the customers may require include image quality, size of messages, types of message content, and message blocking. The present invention understands that for a messaging service, users might like to adjust their preferences to suit the amount of time they would spend in downloading information. If a single user gets several messages waiting for him in a queue on the server waiting for a login from the associated mobile device 14, then without particular preferences the download could take a long time. Using the system 10, however, the user has an opportunity to reduce the image quality to reduce the message size or implement a maximum limit for message size. Message blocking can be used for annoying messages.

For information services, customization may take the form of a custom stock list, news topic selections, weather related to a particular location, tracking specific currency rates, etc. For example, the user can establish his personal preferences filter on one of the servers shown in FIG. 1 such that only breaking news is delivered to the user's wireless device. The user can alter the filter to increase or decrease its strength, e.g., the user can select only sports news, or only baseball news. Updating the filter can be done via a web site. During data transfer, the first part that synchronizes can be the personal preferences filter, which may include the size of the data or minutes available for synchronization, new filter settings that are available (that have been recently posted on the server), and priority of preferences (which can change based on time, since during business hours some information can be more important than during leisure hours).

With respect to the authentication step at block 44, each user of the system 10 can be pre-registered. Personal user information can be provided and stored, preferably on one of the servers shown in FIG. 1. The user information can include a user identification and password, which must be provided to complete authentication. The user identification can also be used for targeting, to send and receive messages in the case of PDAs. A phone number may be used to target mobile phones.

Preferably, the authentication module is written independently of the application logic of any service provided. Using SOAP (Simple Object Application Protocol), the authentication module may be capable of receiving a request from any service to authenticate the user. Once successfully authenticated, a session identification may be used by the application to complete the service request independent of any further interactions with the authentication module. Thus, the authentication module simply validates the session identification against a session identification database. Preferably, the authentication module contains separate methods to register a new user (insert a record), and to change user information (edit).

Figure 4:
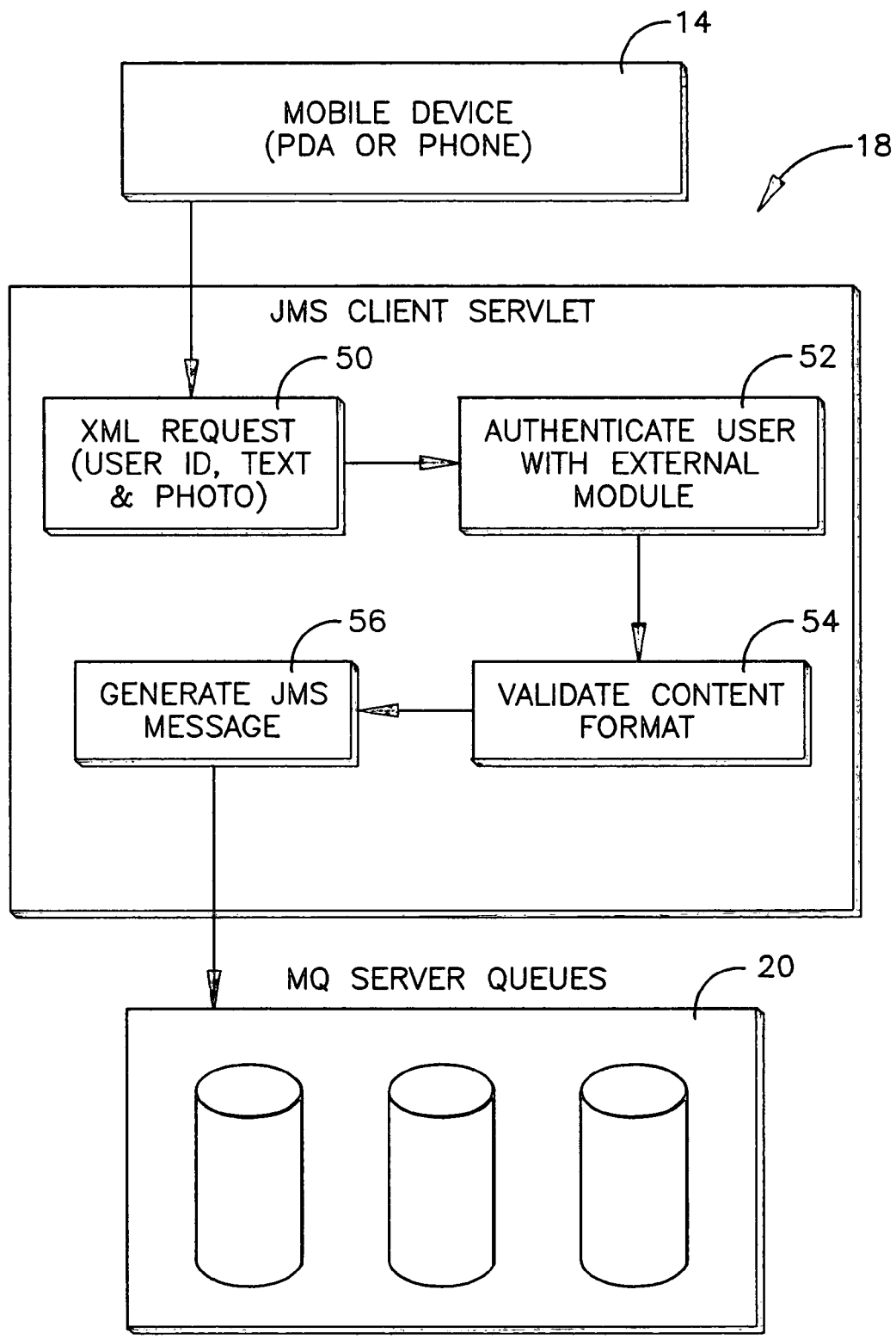
FIG. 4 is a pseudo flow chart showing the logic for sending a message.
Figure 5:
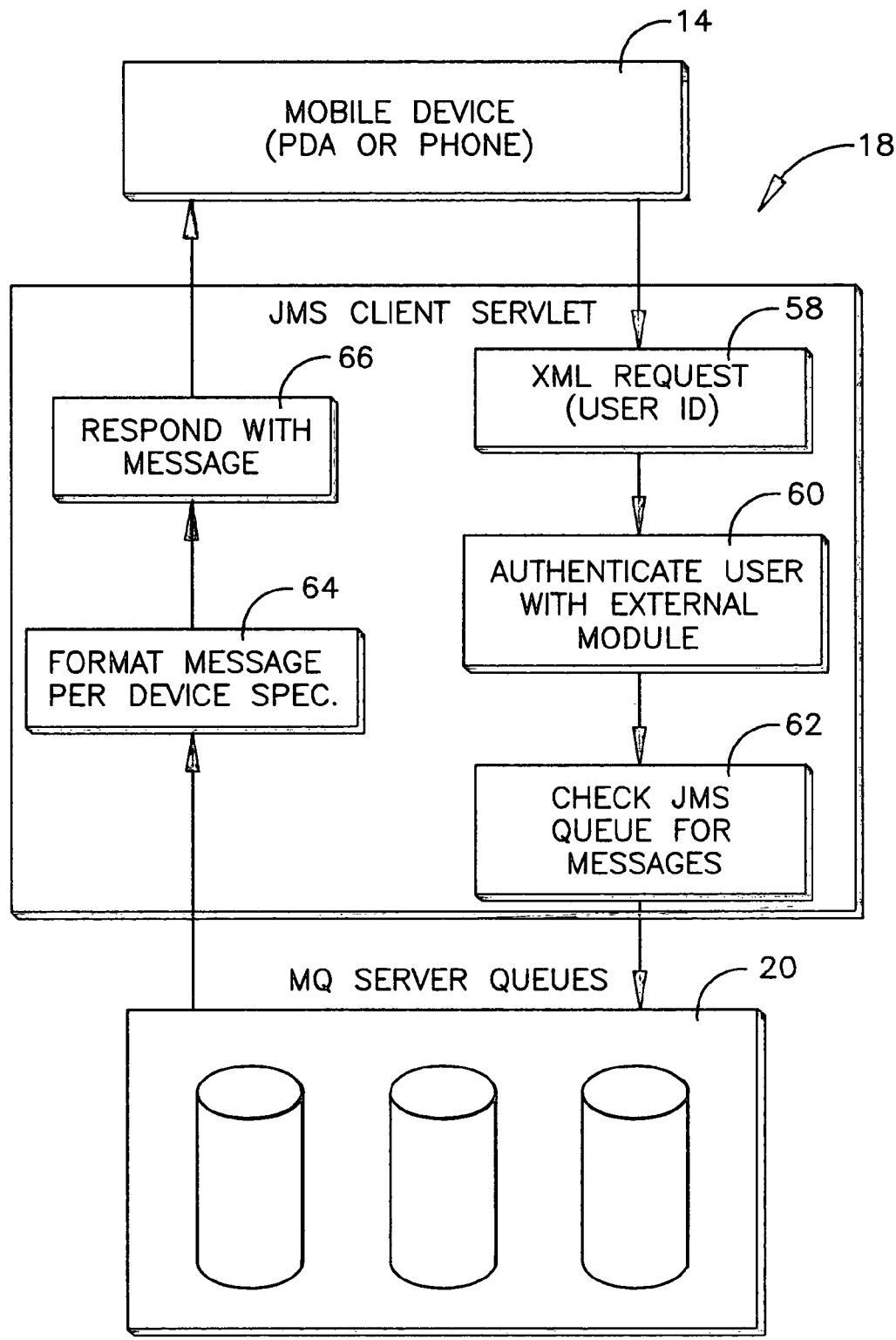
FIG. 5 is a pseudo flow chart showing the logic for receiving a message.

FIGS. 4 and 5 show non-limiting examples of how messaging, including transmitting photos and text, can be implemented for sending messages to other mobile devices (FIG. 4) and to receive messages from other mobile devices (FIG. 5). In overview, a message from a mobile device 14 is received by a software-implemented photo messaging JMS client program that can be in the form of a servlet that may be executed by the application server 18 associated with messaging. In one embodiment, the message servlet receives a request from a mobile device 14 and translates it into a request that the MQ server part 32 (FIG. 2) understands. The MQ software accepts the message and puts it into a unique queue as specified by the JMS client. In this example, the servlet has acted as a message producer and has sent a message to the MQ server part 32 to be placed in a specified queue. When a mobile device request arrives checking for messages, the messages addressed to the mobile device are popped from the queue one by one, in which case the servlet acts as a message consumer, passing the identity of the queue it wants to check for messages.

With this overview in mind, an XML request to send a message can be received at block 50, and the user authenticated using the external authentication module at block 52 in accordance with principles discussed previously. The content format may be validated at block 56, e.g., the content can be validated to be text and/or photographs. The above-discussed JMS message may then be generated at block 56 and sent to the MQ server queues as shown, with the MQ server queues being hosted on a database server 20 or application server 18.

In exemplary non-limiting FIG. 5, an XML request for messages addressed to the requesting wireless device 14 is received at block 58. At block 60, the requesting user may be authenticated, and then at block 62 the MQ message queues are checked for messages addressed to the requestor. At block 64 any relevant messages are received and formatted per the user-defined preferences discussed above. If desired by the user, for instance, when retrieving messages, only message headlines can be initially displayed, instead of the entire message, to facilitate quickly scrolling through potentially many messages. The response consisting of the requestor's messages can be sent to the wireless device 14 at block 66.

As recognized herein, mobile devices 14 may be limited by screen size and so a user may have difficulty to conveniently view complex web pages. As mentioned above, however, the user of a wireless device 14 can "customize" received information by entering preferences into the system 10, and this applies to information services as well, including but not limited to headline news from a web server 16, stock quotes from a web server, currency rates, and location-based weather.

Figure 6:
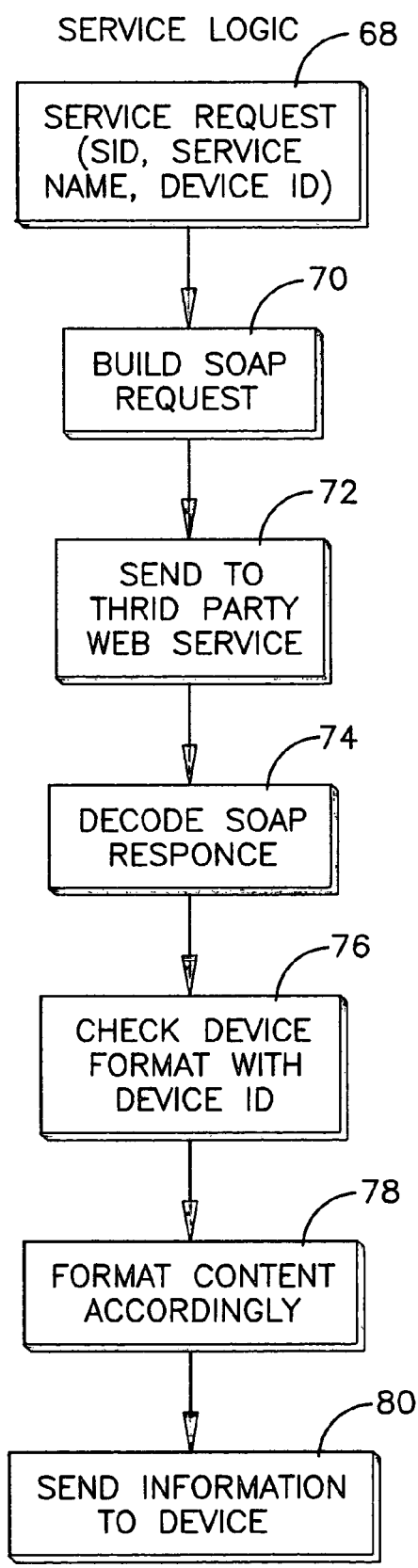
FIG. 6 is a flow chart showing the logic for requesting a service.

Accordingly, referring to FIGS. 6 and 7 and assuming for illustration that weather information may be desired by a user of a wireless device 14, at block 68 in FIG. 6 the mobile device 14 transmits an initial information request. A web service platform on the application server 18 then generates a SOAP request at block 70. The SOAP request can be sent to a third party content provider (e.g., one of the web servers 16 shown in FIG. 1) at block 72, which responds with a SOAP response containing the requested information. The SOAP response is decoded at block 74, and the identification of the requesting device 14 can be compared to the device database to obtain the device-specific preferences/capabilities at block 76, in accordance with principles set forth above. The content can be formatted per the preferences/capabilities at block 78 and sent to the requesting device 14 at block 80. FIG. 7 shows an example SOAP request in accordance with the logic of FIG. 6.

For applications used by the mobile devices 14, it is preferable to use a single technology and be able to use it on various types of devices 14. As recognized herein, the J2ME Java platform provides this capability, since most phones and PDAs are Java enabled.

The present invention further recognizes that the Mobile Information Device Profile (MiDP) combined with the Connected Limited Device Configuration (CLDC), can be the Java runtime environment for many mobile devices 14 such as wireless telephones and PDAs. MIDP can provide sufficient application functionality that might be required by mobile device 14 applications including user interfaces, network connectivity, and local storage management. Mobile Information Device Profile 2.0 (MIDP2) can be used, for instance, to develop a photo messaging application for the Sony CLIE® PDA, which may not otherwise be able to use J2ME. Such an application can be transferred between the CLIE and any Java enabled wireless telephone.

Further to messaging applications on wireless devices 14, a messaging application can use the Palm native development environment referred to colloquially as "Code Warrior". An XML interface can be used to communicate with a JMS server.

While the particular MESSAGING AND SERVICE SYSTEM FOR MOBILE COMPUTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A service including a method, comprising:
   sending from a computer, to a wireless computing device, rich content messages including text and photographs, wherein the rich content messages are received by a messaging Java Message Service (JMS) servlet, the servlet receiving a request from a mobile device and translating the request into a request that a Message Queue (MQ) server understands, the MQ server enqueuing the message, such that when a request from the wireless computing device arrives checking for messages, messages addressed to the wireless computing device are sent from the queue;
   receiving from a computer customer-generated image quality and/or message size preference signals, the signals indicating a priority among the preferences, the signals indicating at least one change in the priority based on time of day; and
   validating message content to ensure that messages are sent to the wireless computing device in conformance with the customer-generated image quality/message size preferences.

2. The service of claim 1, comprising sending the messages across a heterogeneous network.

3. The service of claim 1, comprising further establishing message content based on display capabilities of the device in addition to establishing the message content based on the customer-generated preferences.

4. The service of claim 1, comprising receiving at least one message from the device.

5. The service of claim 4, wherein the device sends an XML request to send a message, and the method includes:
   authenticating the user of the device using an external authentication module.

6. The service of claim 5, comprising:
   generating a Java Message Service (JMS) message; and
   sending the JMS message to at least one server queue.

7. The service of claim 1, comprising:
   receiving, from the wireless computing device, an XML request for messages addressed to the wireless computing device;
   authenticating the user of the device;
   checking at least one server queue for messages addressed to the wireless computing device;
   formatting at least one message for the device per user-defined preferences; and
   sending the message to the wireless computing device.

8. The service of claim 1 comprising validating the message to ensure the message includes only text and/or photographs and if validation is successful generating a JMS message that is sent to the MQ server.

\* \* \* \* \*